(12) United States Patent  (10) Patent No.: US 8,645,105 B1
Shepherd et al.  (45) Date of Patent: Feb. 4, 2014

(54) METHODS AND SYSTEMS FOR ROUND-TRIP EDITING OF COMPONENT ARTWORK

(75) Inventors: Mark Shepherd, Tiburon, CA (US); Narciso Jaramillo, Piedmont, CA (US); Robert Tyler Voliter, San Jose, CA (US); Michael Schiff, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1326 days.

(21) Appl. No.: 12/271,372

(22) Filed: Nov. 14, 2008

(51) Int. Cl.
  *G06F 17/50* (2006.01)
(52) U.S. Cl.
  USPC ............................................................ 703/1
(58) Field of Classification Search
  USPC ............................................................ 703/1
  See application file for complete search history.

(56) References Cited

U.S. PATENT DOCUMENTS

| | | | |
|---|---|---|---|
| 6,061,696 A | 5/2000 | Lee et al. | |
| 6,813,621 B1 | 11/2004 | Taylor et al. | |
| 7,155,444 B2 | 12/2006 | Krishnan et al. | |
| 7,320,109 B1 * | 1/2008 | Zeevi et al. | 715/763 |
| 7,322,013 B1 | 1/2008 | Benson et al. | |
| 2002/0069204 A1 | 6/2002 | Kahn et al. | |
| 2003/0097491 A1 | 5/2003 | Burbidge | |
| 2004/0205644 A1 * | 10/2004 | Shaughnessy et al. | 715/530 |
| 2006/0136477 A1 | 6/2006 | Bishop et al. | |
| 2007/0055936 A1 * | 3/2007 | Dhanjal et al. | 715/700 |
| 2007/0126732 A1 | 6/2007 | Robertson et al. | |
| 2007/0136662 A1 | 6/2007 | Khaba | |
| 2007/0200873 A1 | 8/2007 | Hsu | |
| 2008/0184139 A1 * | 7/2008 | Stewart et al. | 715/762 |

OTHER PUBLICATIONS

Burger; Macromedia—Dreamweaver—Customizing templates with Dreamweaver and Fireworks; Adobe tutorial; pp. 1-4, 1999.*
Public Forum discussion 2004 (DW/FW MX 2004—Roundtrip Editing a Template—HighDots Forums); obtained from http://www.highdots.com/forums/macromedia-dreamweaver/dw-fw-mx-2004-roundtrip-76..; 2004; pp. 1-9.*
Merry; Roundtrip Edits Between Acrobat 3D and the 3D Toolkit; Aug. 2007; adobe tutorial; obtained from: http://blogs.adobe.com/mfg/2007/08/roundtrip_edits_between_acroba.html; pp. 1-2.*
Baker; Planet PDF—Round-trip Editing an Image with Acrobat 7; obtained from: http://www.planetpdf.com/creative/article.asp?ContentID=Round-tripEditinganImagewit; pp. 1-3; 2005.*

(Continued)

*Primary Examiner* — Hugh Jones
(74) *Attorney, Agent, or Firm* — Kilpatrick Townsend & Stockton LLP

(57) ABSTRACT

A development application can be configured to facilitate editing multiple fragments already associated with an interface design simultaneously using a graphic design application, with the fragments arranged in a logical form supported by the graphic design application. The logical form of the artwork fragments as provided to the graphic design application can correspond to the relationship between different elements of the interface design using the respective fragments. Fragments may correspond to different components, parts of components, and part states, for instance. A method can comprise accessing data defining an interface component and comprising a plurality of logically arranged elements of the component. The method can comprise extracting the artwork and arranging the artwork into a form compatible with a graphic design application. The artwork can be edited in a graphic design application and then re-integrated into the data defining the design elements of the interface after editing is complete.

23 Claims, 9 Drawing Sheets

(56) References Cited

OTHER PUBLICATIONS

Kyrnin: Macromedia Studio 8: A First Look, The Latest Release of Dreamweaver, Flash, and Fireworks; obtained from: http://webdesign.about.com/od/dreamweaver/a/aa080805.htm; Aug. 2005; pp. 1-2.* email communications between Applicants and Examiner; 3 pages, Dec. 2012.*

Office Action dated Dec. 12, 2011 in related U.S. Appl. No. 12/572,760, 32 pages.

Office Action dated Jun. 15, 2012 in related U.S. Appl. No. 12/572,760, 24 pages.

* cited by examiner

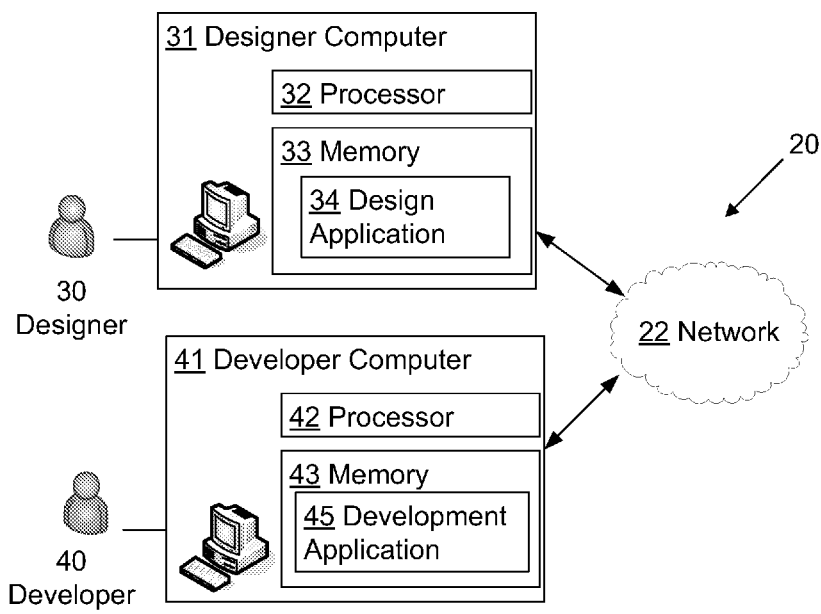
FIGURE 2A
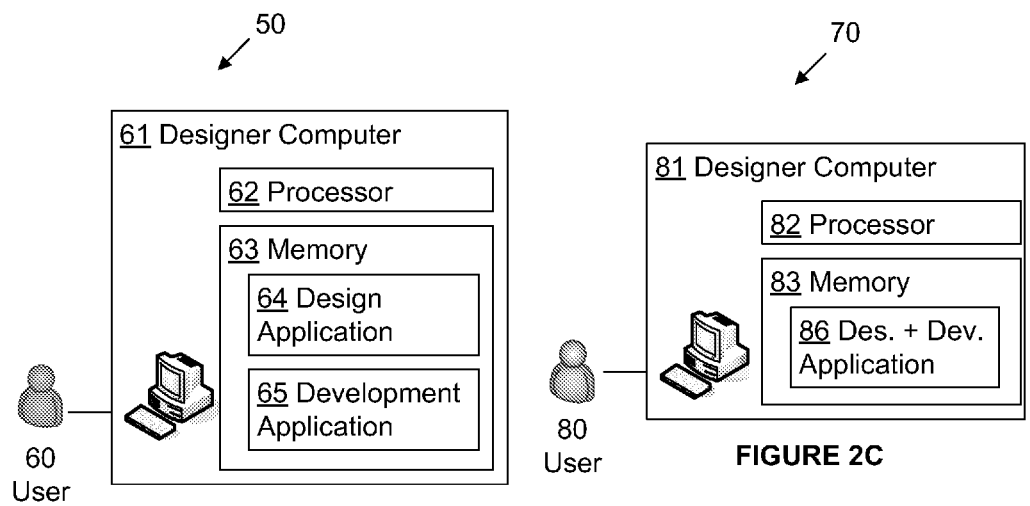
FIGURE 2B
FIGURE 2C

METHODS AND SYSTEMS FOR ROUND-TRIP EDITING OF COMPONENT ARTWORK

TECHNICAL FIELD

The disclosure below generally relates to application development, and particularly to tools that are suitable for editing user interface designs.

BACKGROUND

A user who desires to build an application generally will rely on one or more application development tools to create the application. Although source code for an application can be entered manually in text form, much conventional application development makes use of more sophisticated authoring tools, packages or suites that, in addition to allowing text entry, provide options to aid the code authoring process. As another example, ADOBE® FLASH®, available from Adobe Systems Inc. of San Jose, Calif., can be used to build applications including artwork and dynamic behavior without the specific need to use source code.

A developer may use a particular subset of application development tools to design visually pleasing interface elements in conjunction with art designs. For example, a design artist may prepare one or more representations of desired visual states for an application, generally referred to herein as "artwork." An application developer may use an application development tool to develop one or more applications that use the artwork.

The artwork may be divided into "fragments" representing different portions of the artwork. The visual appearance of a component (e.g., an interface component) may include numerous fragments of artwork, which may represent the appearance of a different parts and states of the component.

As an example, artwork fragments representing different states of an interface component such as a button can be converted by a developer into a suitable form and associated with code defining the button so that, when the code is executed, an interface including the button is produced by the application. The button may support different states, each state having a respective appearance achieved by using different fragments or different arrangements of fragments. As another example, the same artwork fragment may be used in two or more states, but with slight variations in appearance such as color, size, or position. The artwork fragments for the different states may be referred to as a "skin" for the button. As another example, the developer may write code that changes the properties of the button (e.g., color of a box that comprises the button) for different states.

Although an art designer may prepare a visually-pleasing art design, the designer may not be skilled in (or responsible for) preparing the code that implements the design as part of a functional application. Conversely, a developer preparing the code to implement art design features may not be skilled in art design. Regardless of art design capability, making adjustments to a visual appearance of a component by adjusting code may be a time-consuming process.

SUMMARY

An application development tool configured in accordance with aspects of the present subject matter can ease the process of integrating art designs and functional components of an application. An application development tool is referred to below as a "development application," although it could comprise a suite of applications and/or process. Particularly, a development application can be configured so that a designer can edit multiple artwork fragments already associated with an interface design simultaneously in a graphic design application, with the fragments arranged in a logical form supported by the graphic design application. The logical form of the artwork fragments as provided to the graphic design application can correspond to the relationship between different elements of the interface design that use the respective fragments. Fragments may correspond to an appearance of different components, parts of components, and part states, for instance.

The designer's workflow may be improved by reducing or avoiding the need to export multiple artwork fragments of an interface on a one-by-one basis to a graphic design application and then re-import the edited fragments on a one-by-one basis to the development application.

For example, in some embodiments, a method comprises accessing data defining an interface design and comprising a plurality of logically arranged elements. The method can comprise extracting the artwork, arranging the artwork into a form compatible with a graphic design application, and re-integrating the artwork into the data defining the design elements of the interface after editing is complete.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components:

FIGS. 2A-2C are system diagrams illustrating exemplary design and development environments.

DETAILED DESCRIPTION

Figure 1A:
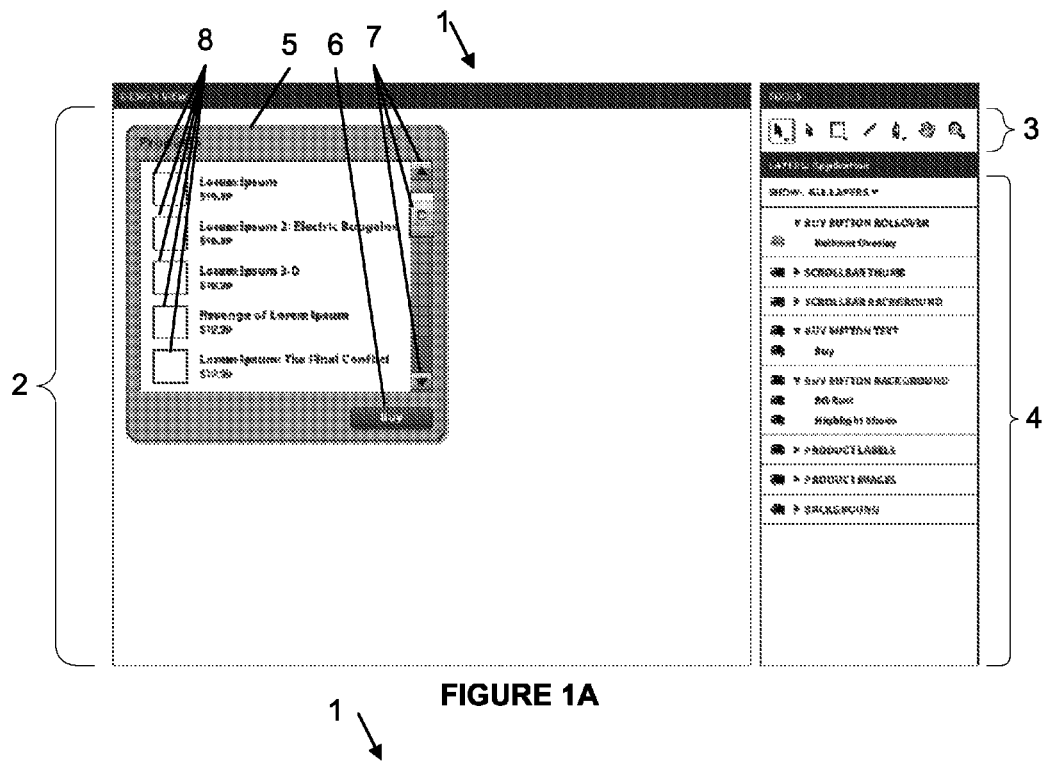
FIGS. 1A and 1B illustrate an exemplary interface of a development application.

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Some embodiments of the present subject matter relate to methods and systems for converting artwork into an application or application component while preserving the layout of the original artwork. Generally, "static artwork" is a collection of one or more graphic fragments, each fragment defined by a shape (for example a rectangle, circle, a complex curve), color and fill, effects and filters, size, location, and/or other visual properties. All or part of static artwork may be a bitmap image of one or more graphic fragments or the static artwork may comprise vector graphics.

An "application" includes one or more user interface components, each component defined by its type (Button, DataGrid, etc), its skins (the visual appearance of the different states of the components), text properties such as font and size (if the component involves text), sample data (if the component involves dynamic data), and so on.

A "component" in the present context refers to any piece of an application or its user interface that has its own encapsulated appearance and/or behavior (e.g. button, checkbox, listbox). A component may or may not have different states and may or may not have one or more skins associated with such states. In this context, the term "skin" refers to the appearance of a component in/over multiple states (for example, its normal state, its mouse-over state, its pressed state, etc.).

In some embodiments, a computer system can comprise a component definition module for managing component definition data, the component definition data defining elements of an interface component for an application under development. Managing can include maintaining the data and updating the data based on user changes communicated via the development application, such as changes in component parts, states, and the like (including adding new components or removing components or sub-units thereof).

The computer system can include an artwork interface module for providing a structured artwork file comprising a plurality of artwork fragments for the interface component, with the structure of the structured artwork file based on the component definition data. For example, the structured artwork file may comprise nested layers or other logical units (e.g. pages, tabs, etc.). Different logical elements of a component (such as, for example, different parts, different states of parts, etc.) as set forth in the component definition data can be placed in different logical units of the structured artwork file. For instance, a component with 20 parts may have 20 nested layers while a component with 4 parts may have 4 nested layers. Each layer nested inside a "part" layer can correspond to a different state for that part.

The artwork interface module may further access data representing a change to the structured artwork file, such as by accessing the structured artwork file based on an indication that a design application has edited the structured artwork file. Based on changes such as an edit to an artwork fragment and/or a change to the structure of the structured artwork file, the component definition module can update the interface component definition data so the component's appearance as displayed based on the definition data matches the appearance as set forth in the artwork file. "Matching" need not be exact—for instance, there may be some loss in the conversion between a particular graphics format and a graphics format used for representing the artwork fragment in the component definition data.

If the change to the structured artwork file comprises an edit to an artwork fragment, updating the interface component definition data can comprise changing data representing a component skin based on the edited artwork fragment. As another example, the artwork may be parameterized (e.g. by lines, curves, fills, gradients, etc.) in the component definition data and updating the component definition data can comprise changing a parameter. The change to the structured artwork file may comprise an addition or deletion of a logical component in the structured artwork file and the component definition module can add, delete, or otherwise change the component definition data accordingly.

In one illustrative embodiment, static artwork created by a designer is used to create an application having functional components. The designer generates a piece of static artwork, for example a vector or bitmap file produced by a visual design application such as ADOBE® PHOTOSHOP®, ADOBE® ILLUSTRATOR®, or ADOBE® FIREWORKS®, all available from Adobe Systems Inc. of San Jose, Calif. However, other visual design applications could be used alongside embodiments of the present subject matter. The artwork is a mockup that represents an overall design for a user interface of an application. The designer sends the artwork to a developer for development of the intended application, perhaps with instructions regarding the intended behavior of the components. The developer converts the artwork from its static design mockup form into a working application.

If needed, using systems and methods configured in accordance with aspects of the present subject matter, the developer can send artwork back to one or more design applications after conversion in order to edit the artwork (or have the artwork edited by a designer). The edited artwork can then be re-integrated into the application and can be said to have taken a "round trip" for editing.

Figure 1B:
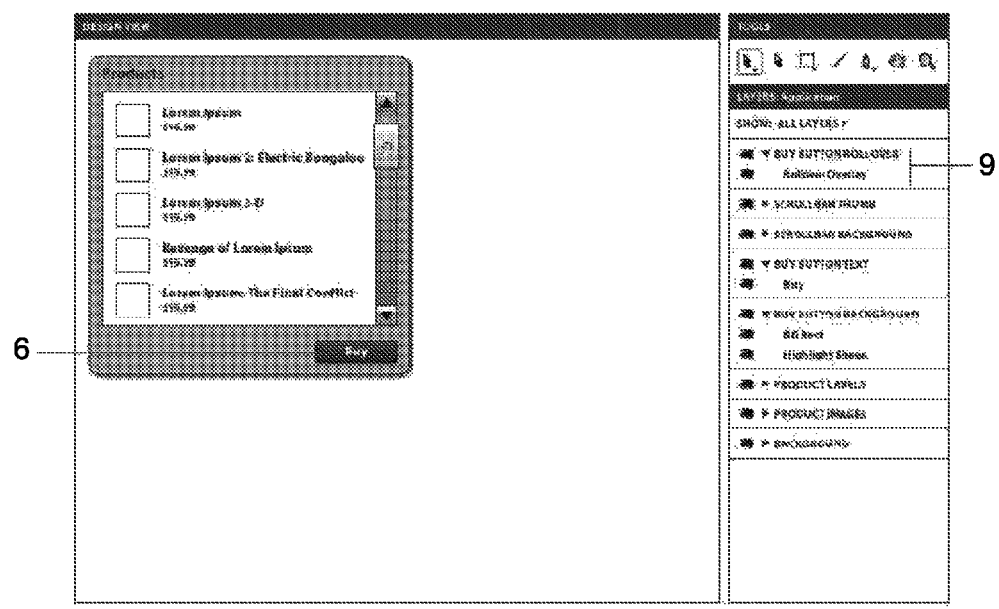

FIGS. 1A and 1B illustrate an exemplary interface of a development application. The overall workspace 1 of the development application includes a design view area 2, a tools panel 3, and a layers panel 4. In the present example, the user imports or draws a piece of artwork 5 into the design view area 2, which shows the artwork design 5 for a simple product browser application. In this case, all the items in the design view area 2 are raw vector graphics (rectangles with gradient fills, rounded rectangles, arrows, etc.). The artwork 5, among other things, shows the intended appearance of various intended components for the application, including a "Buy" button 6, a scroll bar 7, and various check boxes 8. The tools panel 3 contains various tools for drawing and selecting graphics. The layers panel 4 shows the graphic objects in the design, mapped or otherwise grouped based on the designer specified artwork layers.

Such mapping may occur automatically when the artwork is imported into the developer tool. This structure reflects the designer's preferences and may not cleanly map to the final component structure needed in the intended working application. For example, the artwork that will eventually become a "Buy" button 6 may be scattered across different layers of the artwork 5 and thus may not have been grouped together when the artwork 5 was imported.

The developer uses the development application to identify portions of the artwork 5 that relate to the intended button component, for example, the image of the "Buy" button 6 displayed on the artwork 5. The developer then creates a new application component that will replace the static "Buy" button 6, but that will have an appearance similar to or the same as the static "Buy" button 6 image. For example, the vector artwork comprising the static "Buy" button may be saved as a separate file and referenced as a state of the new button component, e.g., the normal-state.

FIG. 1B illustrates features of the development application that allow the developer to further specify characteristics of the new "Buy" button component 6. In this case, the developer uses the interface of the development tool to specify that the "Buy" button will turn green when the application user mouses over it. The green overlay was specified by the artwork designer as a layer of the original artwork 5 that was imported into the development tool. The application developer turns on the visibility over that layer when the button is in its OVER state. In other words, the developer sets up the button component so that when it is rolled over, the overlay artwork layer is shown. For example, the developer may select the OVER state and use options shown at 9 on the layers panel 4 to specify that the BUY BUTTON ROLLOVER artwork layer is visible in that OVER state. The different appearance in different states in this example results from having different artwork fragments that are visible or invisible in different states. Generally, by directly converting portions of the artwork into individual components and component states, the location and appearance of the original artwork is preserved, even though it has been pieced apart and restructured to fit the requirements of the application component.

The artwork may be expressed in the code for the application under development in any suitable way. For example, the code may reference bitmaps or other files that result in desired appearances of components. However, the code may define component appearance by reference to parameters and properties—e.g., a button may comprise an arrangement of parts defined by line, curve, and fill parameters determined by analyzing the artwork to replicate the appearance of the artwork. In some embodiments, different states are achieved by having the same fragment appear in the different states, but with one or more variations in color, size, or other property or properties.

This illustrative example is given to introduce the reader to the general subject matter discussed herein. Further examples of generating application components from artwork can be found in co-pending U.S. application Ser. Nos. 11/833,506 (filed Aug. 3, 2007) and 11/546,004 (filed Oct. 10, 2006), each of which is incorporated by reference herein in its entirety.

In some embodiments, the application components may be specified in code that includes additional parameters to facilitate later round-trip editing. For instance, the code may include details regarding imported artwork that relate to specific features of a particular design tool. For instance, a developer may create a rectangle in ADOBE® ILLUSTRATOR®, and apply Illustrator's Twist effect with a setting of 120 degrees of twist to obtain a twisted rectangle.

Figure 8:
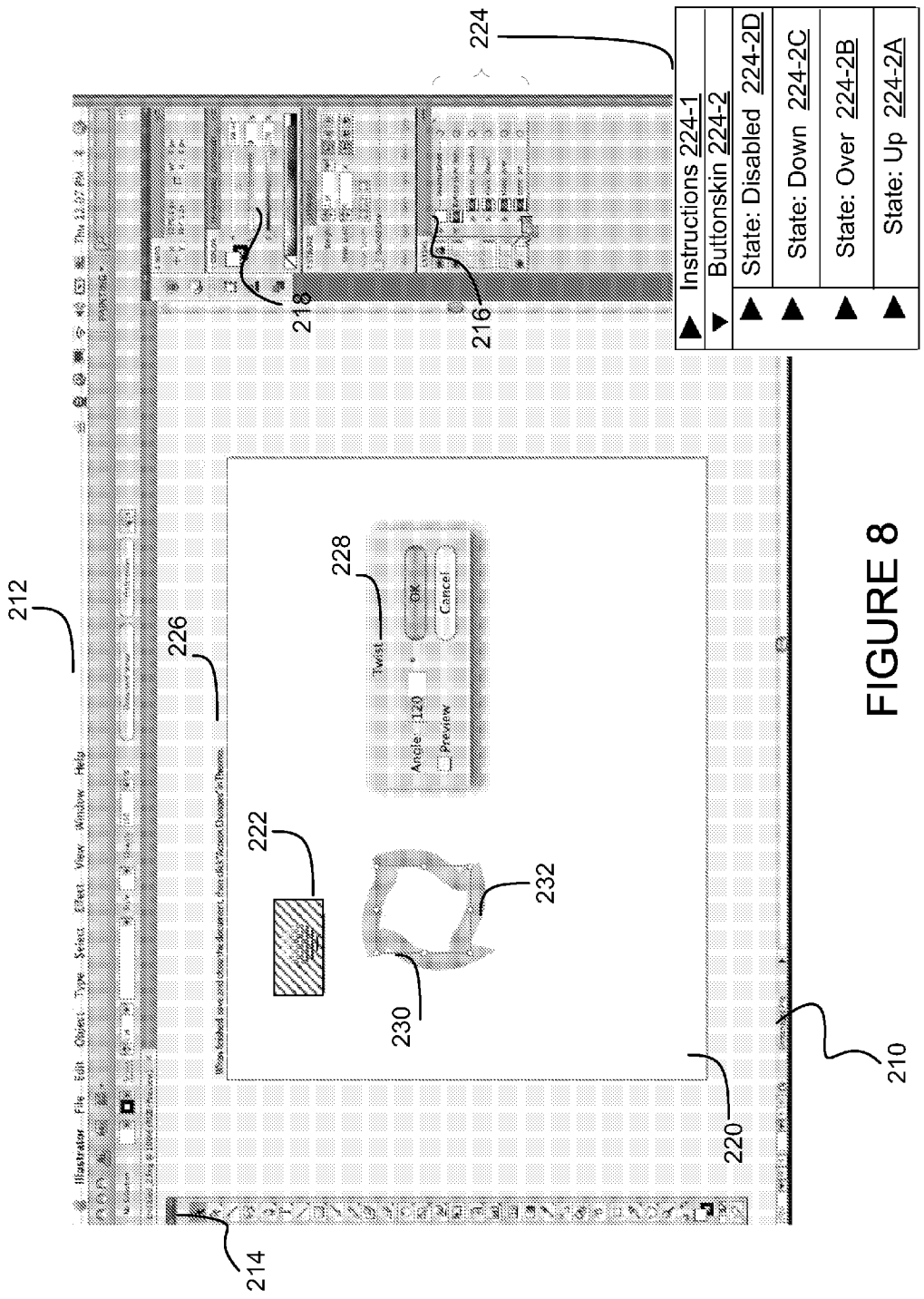
FIG. 8 is an example of a user interface provided by a graphic design application.

Turning ahead to FIG. 8, an example of a twist menu is shown at 230 yielding a twisted rectangle 232 from a rectangle 228. Although FIG. 8 is used in an example below relating to round-trip editing, the same functionality (e.g., the twist feature) can be used to initially develop artwork fragments.

When artwork is imported into the development tool, the development tool can access: (1) a fragment of vector artwork that looks like the green twisty object (e.g., 232 of FIG. 8), (2) historical editing data that records that the "Twist" effect was used and what the settings were (120 degrees). This additional data is not necessarily used in the development tool, but nonetheless can be saved somewhere in the source code of the application under development (e.g., in the component definition data) for later inclusion if the artwork is to be included in a structured artwork file for additional editing using the design tool.

FIGS. 2A-2C are system diagrams illustrating exemplary design and development environments. Other embodiments may be utilized. The system 20 shown in FIG. 2A comprises a wired or wireless network 22 connecting a designer 30 using a designer computer 31 and a developer 40 using a developer computer 41. The devices 31, 41 each may comprise a computer-readable medium such as a random access memory (RAM) 33, 43, coupled to a processor 32, 42 that executes computer-executable program instructions stored in memory.

In FIG. 2A, the designer computer 31 comprises a design application, for example an application that allows the designer 30 to generate a piece of static artwork such as a vector or bitmap file. Exemplary applications include Adobe® Photoshop® and Adobe® Illustrator® as mentioned above, but a variety of suitable applications may be appropriate according to the particular context or embodiment. The developer computer 41 comprises a development tool 45, for example an application that allows a developer to import static artwork and convert some or all of the artwork to functional items to generate a functional application.

Embodiments of the methods disclosed herein may operate within a single computing device 50, 70 as shown in FIGS. 2B and 2C or across multiple devices. In FIG. 2B, one or more users 60 use a designer computer 61, comprising a processor 62 and memory 63 having both a design application 64 and a development tool 65. In FIG. 2C, one or more users 80 use a designer computer 81, comprising a processor 82 and memory 83 having both a design and development tool 86 that allows the one or more users 80 to both design artwork and develop an application using the artwork.

Certain embodiments relate to systems used to design artwork and develop applications. It will be recognized that this is merely one context for the methods and other features described herein. Certain embodiments may not involve initial use of a design application or imported artwork. For example, a development application may support basic art design functionality (e.g. creating basic shapes, lines, and text) that could be used to initially define art fragments. In short, the techniques for developing applications and the other features described herein have uses in a variety of contexts, not to be limited by the specific illustrations provided herein. The system shown in FIGS. 2A-2C are merely illustrative and are not intended to imply that any system component, feature, or arrangement is essential or necessary.

Figure 3:
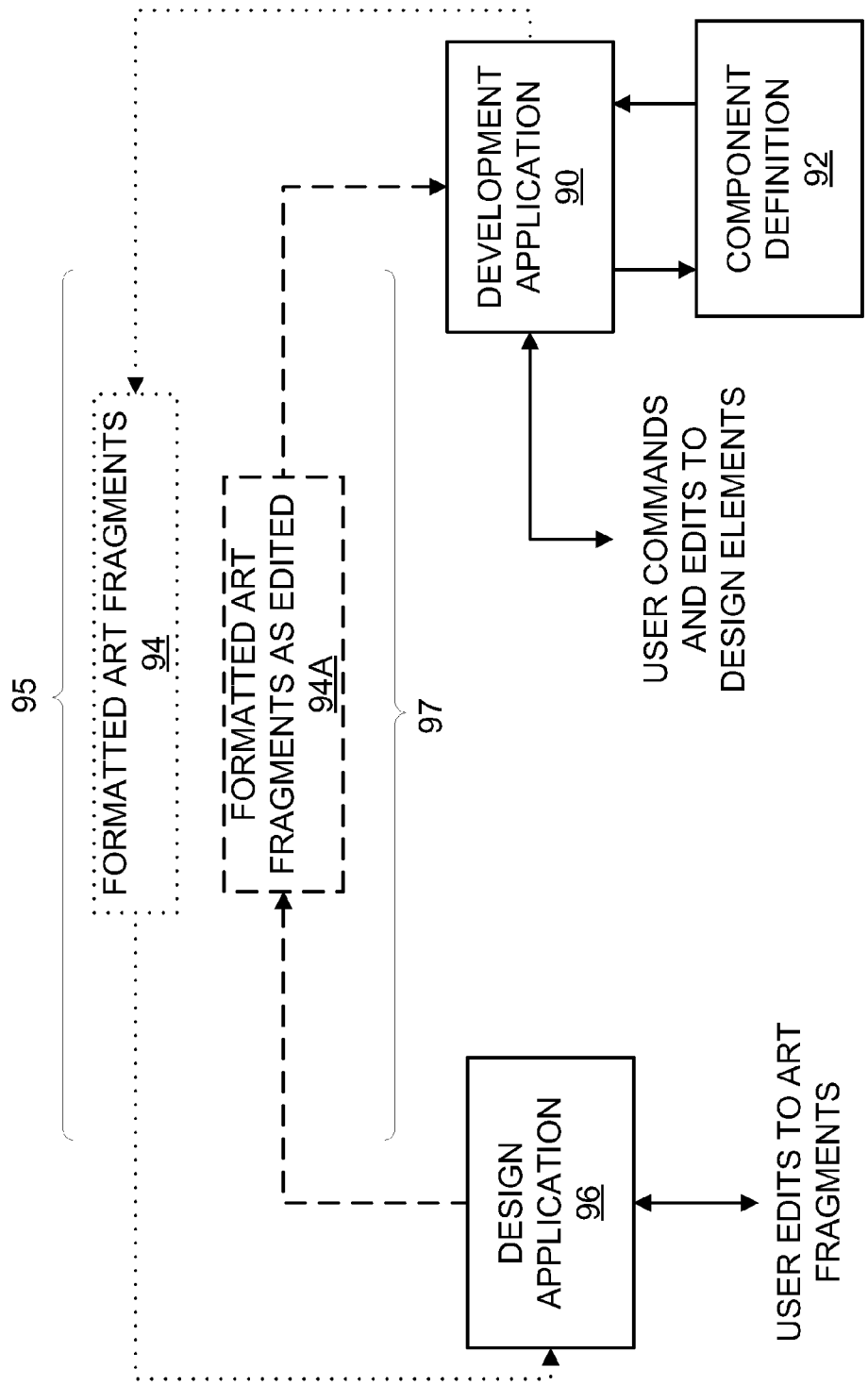
FIG. 3 is a block diagram illustrating an example of workflow using a development tool which supports round-trip editing of artwork.

FIG. 3 is a block diagram illustrating an example of workflow using a development tool which supports round-trip editing of artwork. Particularly, FIG. 3 illustrates use of a development tool 90 that may, for example, comprise an application that allows a user to define components for an application under development using multiple artwork fragments. For example, different artwork fragments may correspond to different states of a given component. Development application 90 may provide additional functionality such as allowing editing of source code elements for an application under development, compiling, debugging, and the like.

In this example, development application 90 stores data defining one or more application components as one or more files that are depicted in FIG. 3 as component definition data 92. For example, component definition data 92 may comprise a structured file including artwork and definitions of various states or behavior for the component. As another example component definition data 92 may comprise a structured file defining a component's behavior and properties (e.g. state, labeling, etc.) with appropriate references to one or more other files that contain corresponding art fragments. As noted above, component appearance may be controlled in whole or in part by parameters that result in a rendering of the component with the desired appearance.

Development application 90 is responsive to user commands and edits to define and/or adjust different components of an application under development. For example, the user may import artwork and define one or more components, such as functional components, using the artwork and then store data defining the components as component definition data 92.

In some situations a user may desire to edit the artwork after the artwork has been incorporated into a component. For example, a user may wish to change the appearance of a button in one or more states. As another example, the user may wish to change the appearance of a component such as a scrollbar.

Certain previous development applications do not adequately facilitate such editing. For example, to add the extensive features of modern art design applications to a development application could render the development application unduly complex.

An alternative to using native editing capability is to edit artwork in a design application. For example, a user could export artwork of a design element to an art design application (e.g. using a copy-and-paste operation), but this course of action could be time-consuming. For example, a button component may have art fragments associated with each of four states. As another example, artwork for a scroll bar may comprise twenty different fragments. Additionally, once editing is complete, the edited art fragment may need to be re-converted into a component along with other artwork fragments since the artwork fragment as edited includes no information about its role as an aspect of a component (e.g., a fragment representing a scrollbar track has no indication of its role as a scrollbar track once it is copied to a clipboard and pasted into a design application).

Instead, FIG. 3 illustrates an improved workflow for editing artwork for use in one or more components of an application. Development application 90 is configured to provide formatted art fragments 94 based on component definition data 92. As shown at path 95, the formatted art fragments are made available to one or more design applications 96. Design application 96 can respond to user edits to the art fragments, including additions, changes, and deletions to the fragments. Then, as shown at path 97, the formatted art fragments as edited 94A are made available to development application 90, which integrates the art fragments into the component definition 92.

The exchange of the formatted art fragments between development application 90 and design application 96 can be facilitated in any suitable manner. For example, in some embodiments, design application 96 may support commands, such as scripting commands. A bridge application capable of interacting with design application 96 and development application 90 may be responsive to output from development application 90 to invoke design application 96 via appropriate commands and direct application 96 to access formatted art fragments 94.

Although the formatted art fragments are illustrated as separate items 94 and 94A in FIG. 3, it should be understood that this is for explanation only. For example, the formatted art fragments 94 may be saved by development application 90 as a file that is opened by design application 96, with changes saved to the same file that is then opened by development application 90. Multiple files could be used as needed. In other embodiments, the formatted art fragments could be passed between development application 90 and design application 96 without a bridge application provided that suitable commands and responses could be passed between applications 90 and 96.

Figure 4:
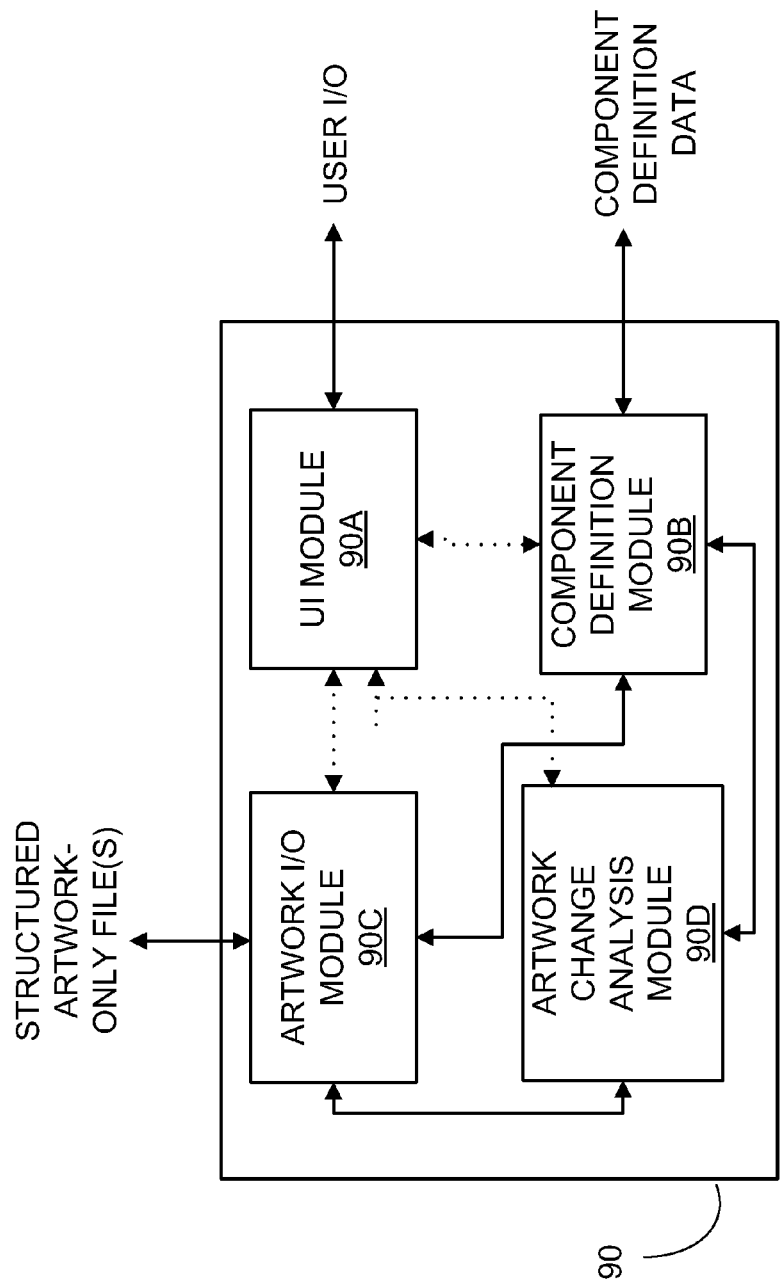
FIG. 4 is a block diagram illustrating an exemplary implementation of a development tool.

FIG. 4 shows an exemplary implementation of a development tool 90. In this example, development tool 90 is implemented as a plurality of software modules, although it will be understood that functionality of the modules could be combined or divided. UI module 90A handles user interface aspects, including receiving user input via a keyboard, pointing device (e.g., a mouse or table) or other suitable input device. For example, gestures (e.g. clicks, selections) and text can be entered by a user. Output includes rendering components and application interfaces under design and other information such as source code or other definition data for components.

Component definition module 90B manages component definition data. For example, managing can include producing component definition data based on user input and provided artwork. When components are initially created from artwork, component definition module 90B may provide functionality as described in the above-referenced '556 and '004 applications. In accordance with the present subject matter, an artwork I/O module 90C can assemble structured artwork-only files from the component definition data for editing by one or more design applications. The artwork-only files can be structured to logically indicate different components, parts thereof, and states thereof. For example, artwork I/O module 90C may rely on templates or other data to determine how to correlate component definition data to particular formats for structured artwork-only files.

Artwork I/O module 90C may include an identifier in the structured artwork file for one or more of the fragments, the identifier(s) indicating the relationship between an artwork fragment and a logical element of the component. For example, an identifier may indicate that a given fragment in the structured artwork file represents a particular fragment of a particular state for a particular part of a particular component.

Artwork I/O module 90C can also handle saving structured artwork-only files and providing suitable signals or commands to a suitable design application (via a bridge application if necessary). Artwork I/O module 90C may further be responsive to a signal, command, or user input indicating when structured artwork-only files are available after editing in a design application and obtaining data indicating the artwork-as-edited (e.g. opening the file after changes have been made by the design application or opening a version of the artwork-only file including the changes).

An artwork change analysis module 90D can be configured to determine which portions of the structured artwork-only file(s) were changed via editing. This information can be used by component definition module 90B to update corresponding component definition data. Artwork fragments as edited can be correlated to logical elements of a component (and thus to component definition data) via one or more identifiers in the structured artwork file.

Figure 5:
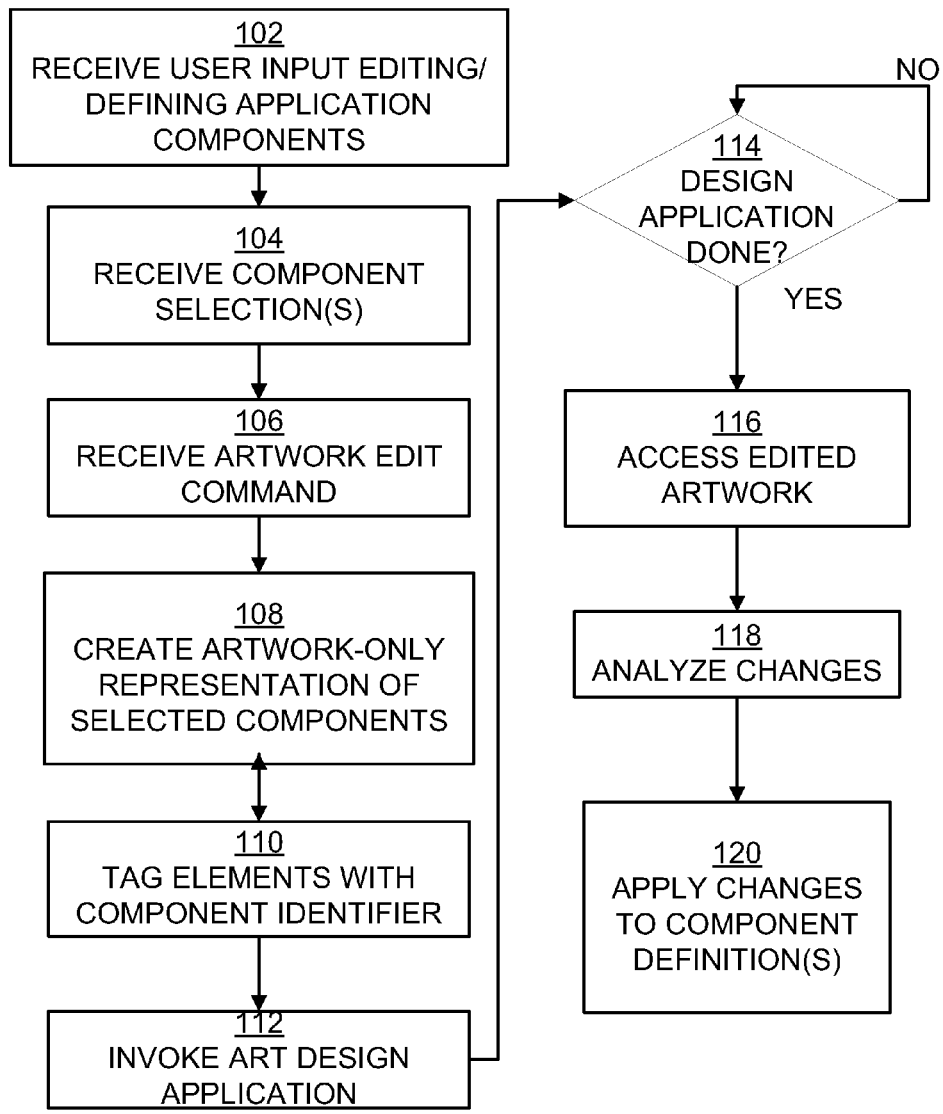
FIGS. 5 and 6 illustrate aspects of an exemplary method for editing application components.

FIG. 5 is a flowchart illustrating an exemplary method 100 for editing artwork fragments that are associated with an application component. Block 102 represents receiving user input editing and/or defining application components via a development application. For example, as was noted above, a development application may support importing an art design and associating various art fragments with different components or states thereof. As another example, the development application may support limited art design such as defining shapes, colors, lines, text, and the like. Of course, if previously-defined components are to be edited, then step 102 could be omitted.

Block 104 represents user input selecting one or more components for artwork editing. For example, a user of the development application may highlight or otherwise select a button for further editing by suitable mouse, keyboard, or other input. At block 106, an artwork edit command is received, which indicates that the user wishes to trigger the use of a design application to edit the artwork of the selected component. In some implementations, the artwork edit command can include a user interface whereby a particular design application can be selected.

Block 108 represents creating an artwork-only representation of the selected component or components. For example, component definition data may include text or other information defining non-artwork elements of the component such as its object or component type, states, and the like. Furthermore, artwork fragments for a component may be scattered throughout the file(s) defining the component or may reside in individual files. Block 108 represents obtaining the various artwork fragments and packaging the fragments into a structured file compatible with the design application which is to be used to edit the artwork.

In some embodiments, the ADOBE® FXG file format is used. In other embodiments, multiple structured files could be used. As another example, the structured artwork file may comprise a file in the native format of the design application (e.g., if ADOBE® ILLUSTRATOR® is the design application, the structured artwork file may comprise a *.AI file, while if the design application is ADOBE® PHOTOSHOP, the structured artwork file may comprise a *.PSD file). The structure is used to package the artwork fragments in a logical manner that provides a roadmap of where the artwork fits in the overall design when accessed via a design application. Additionally, the structure is used by the development application to identify what (if any) changes to make to component definition data after the artwork has been edited via the design application.

For example, the artwork fragments may be assembled into a file having multiple layers or pages, with each layer or page containing artwork fragments for a different component state. In some embodiments, the file can have nested graphic elements. For example, each top-level layer can represent a different component (if multiple components are selected for editing at once). The next level layer can correspond to a state of the component. Each layer below the "state" layer can correspond to a different part for the component in that state. If a component only has one "state," then the "part" layers may be directly below the "component" layer.

As an example, if two buttons each having four states are selected, the artwork for the buttons may be gathered and packaged into a file having two "component" layers, with each "component" layer having four "state" layers, each "state" layer having the art fragment(s) for the part(s) of a given button in a given state.

It might happen that the original component definition expressed the appearance of different states by using 1 or more artwork fragments that appear with slight variations in all the states. For example, a button may use the same "rectangle" artwork fragment, with the variation in states specified in the component definition data as a change to a "fill" parameter controlling the button color. In most cases, a design application does not support the concept that a single piece of artwork can appear multiple times with slight variations in appearance. Therefore, in this case, each variant of the original artwork fragment is represented in the structured artwork file as a unique fragment. When the artist is working in the design tool, each variant is a separate object and can be edited separately.

Although layers and pages are discussed in this example, it should be understood that any suitable logical division supported by a design application can be used. For example, the development application may rely on templates, metadata, or other information defining the particular file structure to be used when providing artwork-only representations to a particular design application.

In some embodiments, the component definition data specifies visual elements of a component using a source code language such as MXML, which may be compiled into ADOBE® FLASH® or AIR® applications. For example, visual elements of a component may be specified using artwork objects such as bitmaps, text, and vectors and properties for the objects. Properties can include, but are not limited to, color, gradients, stroke and fill settings, font and character style, alignment, position, and so on.

When representing visual elements in a structured artwork file, the format of the structured artwork file may facilitate round-trip editing for certain design tools. For instance, the FXG format noted above may be particularly suitable for ADOBE® ILLUSTRATOR® or FIREWORKS®.

Other design tools may operate differently. For example, certain versions of ADOBE® PHOTOSHOP® include limited support for vector artwork. In such a case, some or all of the vector artwork may not be sent for round-trip editing. For example, the vector artwork may not be included at all in the structured artwork file or may be converted into bitmaps and included in the structured artwork file for reference only. Thus, in certain embodiments, re-conversion from bitmap back into vector artwork is avoided due to the potential loss of fidelity.

It can happen that part of the visual appearance of a component is in the form of items that cannot be round-tripped to a particular design applications because they are not in a form (bitmap, text, vector art) that can be edited by the design application. For example, a component may contain an artwork fragment that is a piece of video, or may contain a graphic that is drawn algorithmically by user-written code. These particular fragments cannot be meaningfully edited in present versions of ADOBE® ILLUSTRATOR®, for instance.

However, it may be desirable for these fragments to appear during the round-trip in order to provide context and visual reference for the artist while s/he is working on the editable fragments. In some embodiments, the development tool can include a placeholder image (e.g., a bitmap) that is representative of what the fragment look like (for example the image might be a single frame of the video), and then include that image in the appropriate location in the structured artwork file together with an indication that the item is "locked" (i.e. non-editable). When the round-trip completes, the development tool ignores any and all changes that the user may have made to the placeholder image.

Certain properties may not be expressed in the structured artwork file but it may be meaningful to edit the artwork is a design application without having those properties. For example, some properties are expressible in MXML but not in FXG. Particularly, layout constraints may be expressed in MXML to specify how artwork should be positioned with respect to other artwork. In some embodiments, the layout constraints are not included in the structured artwork file, but the artwork may still be effectively edited without loss of fidelity. When the round-trip completes, the layout constraints are re-applied to the artwork.

Block 110 represents tagging the elements of the artwork-only representation with component identifiers. The respective logical units of a file can be labeled appropriately to facilitate the art design editing process. The labels may also assist in correlating particular artwork fragments to logical elements of a component when identifying changes to make to the component definition data when editing is complete. As an example, a structured file can comprise artwork fragments representing different states of a button designated "BUTTON1" arranged into nested layers. A component layer can be tagged with a label "BUTTON1" to identify the component. Each state layer nested beneath the component layer can be tagged with an appropriate label such as "STATE=UP," "STATE=DOWN," etc.

Block 112 represents the development application invoking the design application directly or indirectly. For example, the development application may provide an indication to a bridging application that passes commands to the design application. ADOBE® BRIDGE® is an example of a bridging application that can be used in some embodiments. If the design application supports scripted commands, appropriate commands can be relayed to the design application by the development application (via the bridge application, if needed). In some embodiments, a bridge application may not be needed. For example, the development application may support communicating directly with the design application via a messaging or other capability.

In any event, the design application is provided with information sufficient to locate the artwork-only representation of the selected component(s) and a command to provide an interface to edit the artwork-only representation. For example, if the design application is not currently executing, then it may be launched in response to the command. If the design application is currently executing, then the command may simply direct the design application to access the artwork-only representation of the selected component(s). The data comprising the artwork-only representation can be provided directly to the design application or the commands may direct the design application to the location of the data (e.g., file location).

Block 114 represents that the development application then waits for an indication that editing activity is complete. In some embodiments, the development application may be configured to continue allowing other tasks to be performed while waiting, such as adjusting other components or other aspects of the application being developed. This could, for example, allow an application developer to continue other work while a designer addresses changes to the artwork. The development application could be configured to time out, of course, if a suitable response is not received after a given time interval.

In some embodiments, the user's view may be shifted to the design application. For example, if a bridge application is used, the bridge application may command the development application to minimize or otherwise shift to a less prominent view while simultaneously bringing up the design application.

The completion of editing activity can be indicated in any suitable way. For example, the design application may send a signal or command to the development application and/or return one or more files providing the edited artwork. This may be done directly or may occur via a bridge application. As another example, a user of the design application may simply save the file comprising the artwork-only representation and provide input to the development application. For instance, in one embodiment, the development tool provides a suitable interface whereby a user can indicate that changes have been made and work with the design application is done. For example, the design application may provide an "accept changes" button in the design application interface that becomes available once the artwork-only representation has been provided and simply wait for the user to signal to the design application that the changes have been made.

At block 116, the development application accesses the artwork as edited. For example, in some embodiments the design application saves changes to the file provided by the development application and the development re-opens the file after the edits via the design application are complete.

Block 118 represents analyzing changes to the artwork-only representation of the selected component(s). As was noted above, the development application can provide the artwork-only representation as a structured file, with the structure of the artwork file corresponding to different components and states thereof, for instance.

Analyzing changes to the artwork-only representation can comprise determining if changes have been made to the structure and/or tags of the artwork file. For example, if different components and logical elements thereof are indicated as different layers in the artwork file structure, then deletion, transfer, or addition of a layer can correspond to removing, changing, or adding a state or component. Additionally, even if the structure of the artwork file is unchanged, the artwork may have been modified.

In some embodiments, items in the structured artwork file are correlated to particular components by ids and position in the structured artwork file. The development tool can use the id to locate the item in the structured artwork file, and the item itself is examined to find changes in the item's properties. The location in the structured artwork file is used to see which state, part, or group the item may have been moved to. The position in the file also indicates what the item's Z-order position is. Some items in the file may not have identifiers (because they were added during the round-trip); for such items, the position in the file tells the development tool where these items should be inserted in the component definition data.

For each changed element in the artwork file, the development tool locates the corresponding component definition data and updates the artwork-related portions thereof. For example, if the color of artwork representing a particular state for a button is changed in the artwork-only file, then a parameter or property defining color for the button for that state in the component definition data can be updated. If the position of the artwork is changed, position data for the button in the component definition data can be updated. As another example, if the artwork defines a skin for the button, then the portion of the component definition data that is used to provide the skin can be updated. For example, the component definition data may include graphical data (e.g. bitmaps) that is used in rendering the component, and such data can be updated based on the artwork fragment.

As was noted above, a component part may be represented in the component definition data as a single artwork fragment with variations in position, color, size, and the like specified by parameters for different states. However, the variants may be represented as separate objects in the structured artwork file to allow independent editing via the design tool. When the artwork is re-integrated back into the component definition data via the development tool, the changes to the variants will be applied back to the same original fragment by changing that part of the component definition data that defines the per-state variations.

For example, if a button includes a single rectangle varied in different states by a color parameter, a separate rectangle will appear in the structured artwork file for editing. When the structured artwork file is checked for changes, changes will be expressed in the component definition data in terms of parameters. For instance, if one of the colors for a state is adjusted, then the corresponding color parameter will be changed in the component definition data after editing with the design tool is complete. As another example, if the rectangle's size is varied for one state, then a size parameter may be changed for the data corresponding to the state in the component definition data.

The structured artwork file may include annotations to indicate the effective boundaries of a component. For example, a user may desire for a button or other component to have an effective bounding-box that is a specific size (different from the visual bounds of the artwork) in order for the layout system to work properly. As another example, the user might have explicitly set the bounding box of something like a scrollbar thumb in order to leave a dropshadow outside the effective bounds. In some embodiments, annotation graphics (e.g., crosshairs) can be added to the structured artwork file to represent the corners of the bounds so that the user can see and adjust these when necessary. The annotations can be tagged so that the development tool can recognize that edits to the annotations are intended to reset the bounds when the artwork is analyzed and used to adjust component definition data.

Component tags may be used in correlating elements in the artwork file to logical elements of components. For example, if a new state is defined in a new layer nested inside a component or part layer, a corresponding state may be defined in the component definition data based on the tag associated with the new layer.

Properties of existing objects that can be changed during round-trip include (but are not limited to) color, size, scale, skew, rotation, gradient settings, filter settings (e.g. drop-shadow), text and font properties, actual text, bitmap pixel content, stroke settings, mask settings. Structural changes allowed in some embodiments include: add/remove states, add/remove artwork fragments (e.g. add more artwork to the 'up' state of a button), replace an artwork fragment with a different type (e.g. replace a Rect with a bezier Path). Various examples of properties changed during editing are not meant to be limiting. Rather, the principles taught herein can be applied to other types of visual parameters used to express an appearance of an item, including parameters that may arise in future versions of the design/development applications.

As was noted above, the component definition data may include historical art design data not used to render the visual appearance of the component but is included to facilitate editing of the component at a later time with a feature supported by a specific design tool (or tools). If a particular visual element includes such data, the additional information can be included in the structured artwork file in a way that the design tool can recognize it. The result is that the design tool knows not only what the object looks like, but also knows about the specialized feature that created the graphic. The user therefore has the opportunity to edit the original specification and hence fine-tune the original specialized effect without having to re-create it from scratch. This can save a lot of work for the user, and gives more opportunities for the user to easily fine-tune how things look. When the round-trip completes, the additional data (now updated) can be transmitted via the structured artwork file back to the development tool, which will store it away in case it is needed in the future.

Continuing with the "twisted rectangle" example above, the component definition data can include historical data specifying that the rectangle was created using the "Twist" effect in ADOBE® ILLUSTRATOR®. If the fragment is to be included in a structured artwork file to be edited by ILLUSTRATOR® (or another tool supporting the "Twist" effect), then the historical data can be included to allow the user to edit the rectangle in terms of the "Twist" parameters (e.g., change the 120 degree twist to another number).

Generally, all positioning in the design applications is absolute—while editing in the design application a user can move artwork to any position. A development application may support several ways of positioning, for example: absolute, relative to other objects, or automatic (e.g. in a grid or horizontal list). After round-trip, a development application can interpret position changes as appropriate based on the component definition data.

For example, if the object is originally specified as absolute positioned, then any changes in position introduced during the round-trip can be interpreted as changes to the absolute position. If the object is originally specified as relative positioned, then any changes in position can be interpreted as changes to the relative position. If the object is originally specified as automatically positioned, then any changes in position during the round trip can be ignored.

By preserving the remaining portions of the component definition data and updating only the artwork, other aspects of the component design can be preserved during the editing process. In a particular application under development, it can happen that there are certain properties of certain components that are not under the control of the applicable component definition data. A developer may choose to write program code to control these certain properties, perhaps to achieve custom visual or animated effects.

For example, the component definition data may define non-artwork elements such as effects or interactive actions for a scrollbar. If artwork for the scrollbar were simply imported as a new component, the developer would likely need to re-define the effects and other non-artwork aspects.

Certain non-artwork portions of the component definition data can be changed in response to particular edits in the design application. For example, changes in the structure and/or identifiers included in the artwork-only representation can be interpreted as additions, deletions, or changes to portions of the component definition data. For example, if another "state" layer is added to the artwork-only representation, then component definition data can be updated to reflect an additional state for the component. If a layer is deleted in the artwork-only representation, then the corresponding component, part, or state may be deleted from the component definition data.

Figure 6:
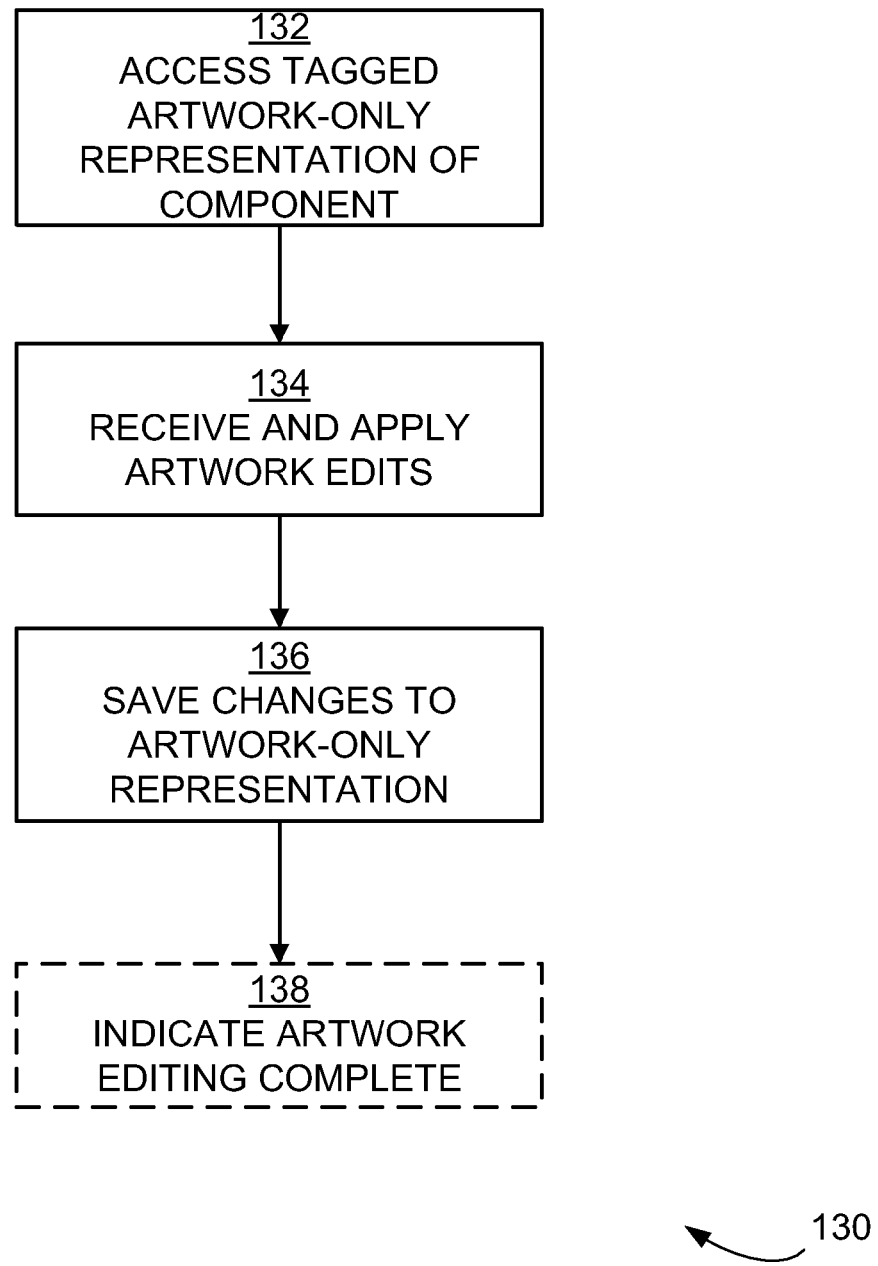

FIG. 6 depicts an exemplary method 130 representing editing artwork-only components via a design application. It will be understood that, in practice, design application workflow may comprise more complex processes, sub-processes, and the like. At block 132, the design application accesses the tagged, artwork-only representation of the component(s). As was noted above, the design application may be directly or indirectly commanded by the development tool to access the file or other data comprising the artwork-only representation. If the design application is not executing, it may be invoked prior to step 132.

Block 134 represents receiving and applying artwork edits per the standard operation of the design application. As mentioned previously, examples of design applications include ADOBE® PHOTOSHOP®, ILLUSTRATOR®, and FIREWORKS®. However, other design applications could be utilized. At block 136, the changes to the artwork-only representation are saved. As mentioned above, the changes are saved into same structured file generated by the development tool is used in some embodiments. Conceivably, separate files could be used (e.g., to preserve versions) provided that the development tool is made aware of the version that represents the artwork-as-edited.

Block 138 represents indicating that the artwork editing is complete. For example, the design application may send a notification or command to the development tool directly or via a bridge application after the edits are saved. However, this block is represented in dashed lines since in some embodiments a design application may not provide such an indication. For example, the design application may simply terminate after editing is complete, with the development tool notified by the bridge application and/or by another component that determines that changes have been made to the file(s) comprising the artwork-only representation of the component. As another example, the user may indicate to the development tool when edits are complete with no further action in the design application after editing and saving the changes.

Figure 7:
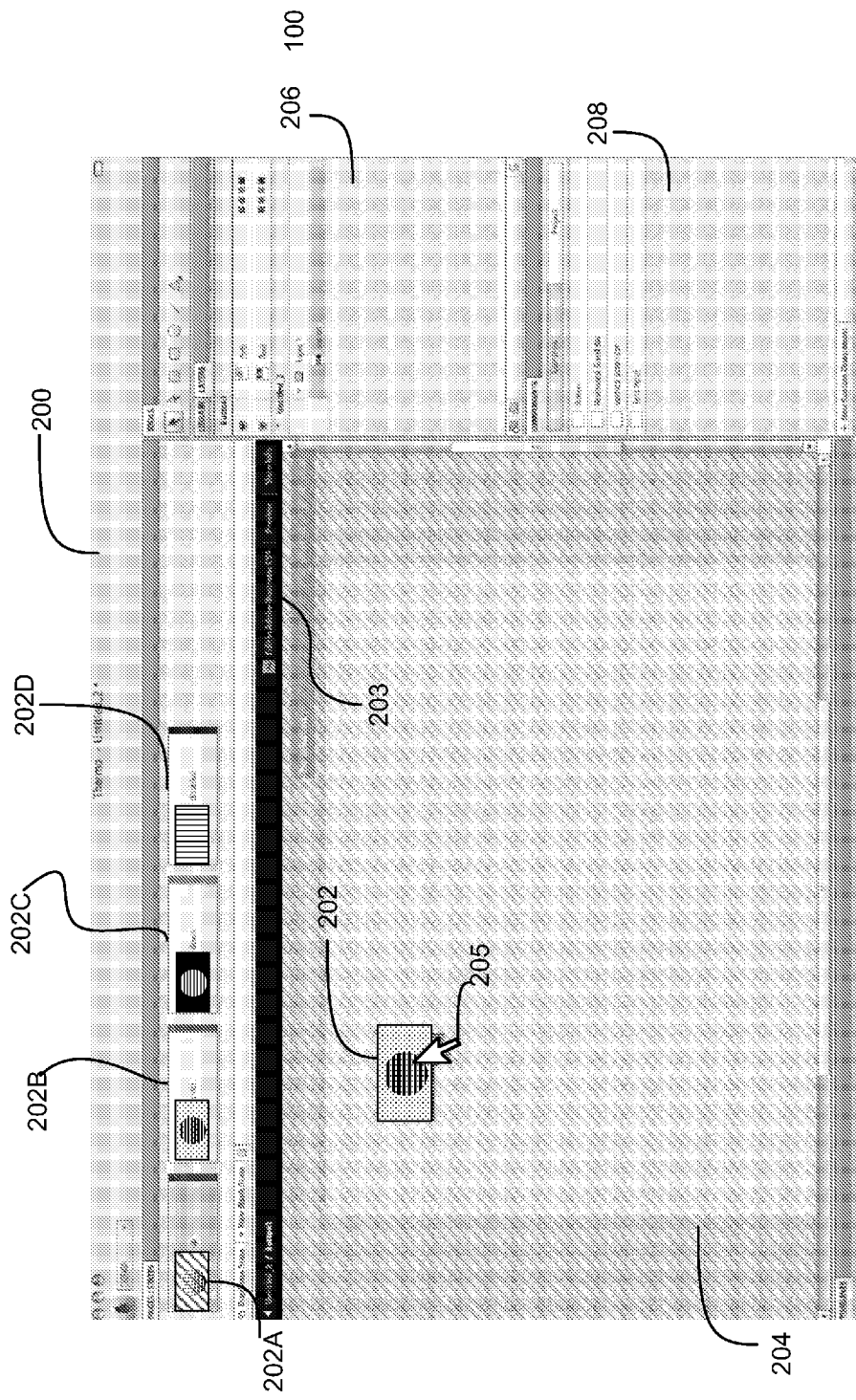
FIG. 7 is an example of a user interface provided by a development application.

FIG. 7 is an example of a user interface 200 which may be rendered by a development tool configured in accordance with one or more aspects of the present subject matter. In this example, user interface 200 is used to edit properties of a button 202 depicted in an editing area 204. In this example, the development tool indicates four states for button 202: an "up" state 202A, an "over" state 202B, a "down" state 202C, and a "disabled" state 202D. In this example, the button has different colors in different states as indicated by the different cross-hatching for each state 202A-202B.

The development tool may be configured to generate code in an application so that button 202 appears as indicated at 202A when enabled but not clicked, appears as indicated at 202B when a cursor is over the button, appears as indicated at 202C while it is clicked, and appears as indicated at 202D when the button is disabled. User interface 200 further includes a tool/component management menu 206 where different layers of the interface under development can be adjusted and tools for defining basic shapes in editing area 204 can be selected. In this example, button 202 appears in editing area and mimics its behavior in different states; in this example, pointer 205 is over button 202, so "over" state 202B is represented in editing area 204. Interface 200 also includes a component selection menu 208 which can be used to define new components.

A user can trigger a design application by clicking in selection menu 203, which in this example provides an option "Edit in Adobe Illustrator CS4." In this example, only one design application is available, but the development tool could support selection from multiple design applications. The user may select button 202 and click selection menu 203 to trigger use of Adobe® Illustrator® to edit the appearance of button 202.

FIG. 8 provides an example of an interface 210 that is provided by a design application. In this example, the design application is Adobe® Illustrator®. The interface includes menu bar 212, tool palette 214, layers menu 216, color adjustment menu 218, and editing area 220 depicting an artwork-only representation 222 of button 202. In this particular example, the "up" state layer (corresponding to state 202A) is visible. As indicated in layers menu 216, the file being edited comprises a plurality of layers 224. Specifically, the layers of this example are as follows, and are also shown in an exploded view in FIG. 8:

| Layer | Tag |
|-------|-----|
| 224-1 | Instructions |
| 224-2 | Buttonskin |
| 224-2D | State: Disabled |
| 224-2C | State: Down |
| 224-2B | State: Over |
| 224-2A | State: Up |

Layers 224A-D are nested inside layer 224-2; the order in the table corresponds to the vertical order in FIG. 8. "Instructions" layer 224-1 was added to the artwork-only representation so that, as rendered at 226 in FIG. 8, the user of the design application is provided with information on the editing process. Namely, the user is instructed to save and close the document when finished and then click "Accept Changes" in the development application ("Thermo" in this example).

In this example, a user has added a square 228 specified as a vector graphics component and selected a "Twist" command that has spawned a menu 230. This represents an application-specific editing technique whereby a twist effect is applied to the square to yield the distorted shape 232. For example, the user of the design application may be adding an additional element to the "up" state or may be about to delete the fragment represented at 222 in order to give this particular state a more distinctive appearance. In any event, data indicating that the "twist" command was used can be stored in the structured data file as historical editing data and maintained in the component definition data. If this particular fragment is to be edited later, the "twist" settings could be adjusted, for example.

As mentioned earlier, other components of an application may be represented alongside a component being edited. For example, if the button being edited was part of a toolbar or otherwise presented alongside a visual component (or components), those component(s) may be added as a "flattened" image for context. For example, a non-editable bitmap may be included as another layer.

Figure 9:
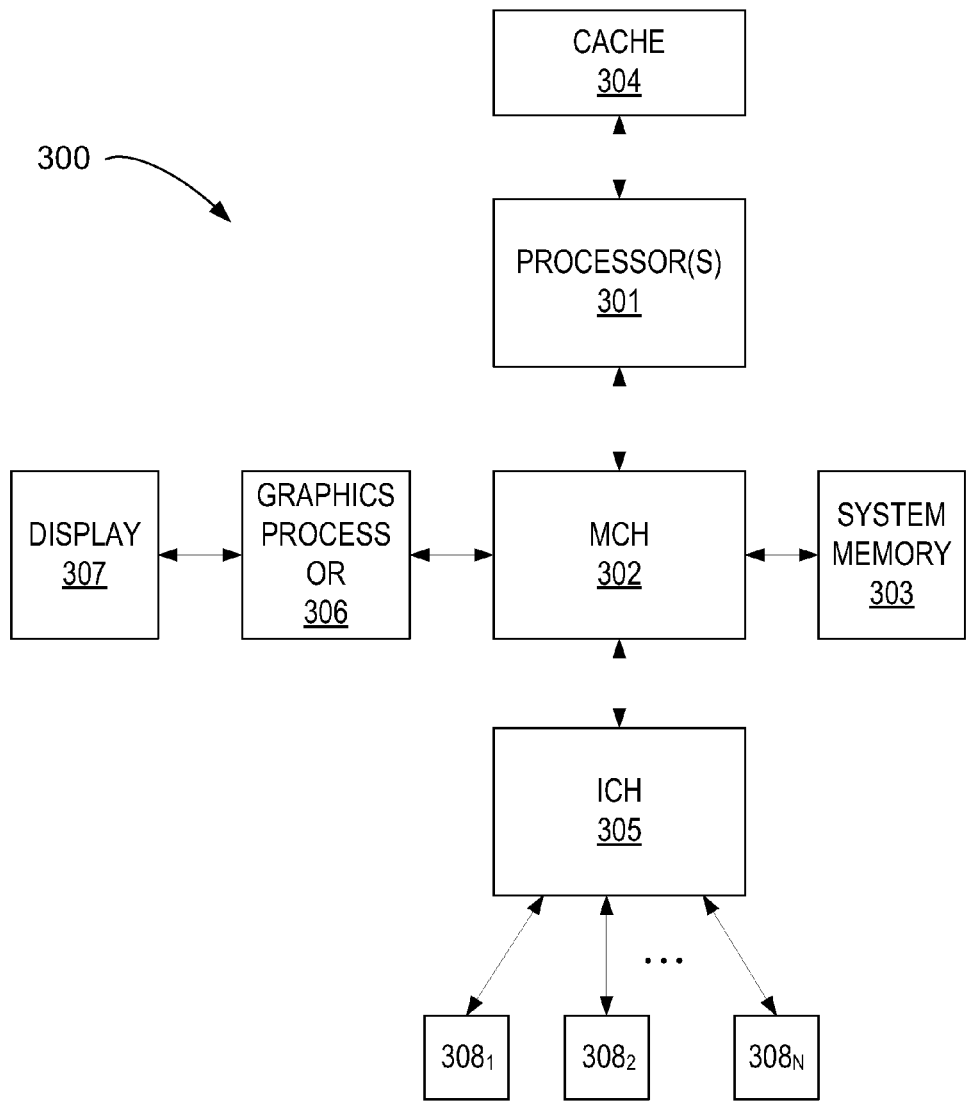
FIG. 9 is a block diagram illustrating components of an exemplary computing device.

FIG. 9 illustrates an example of computing device 300 suitable for implementing embodiments of the methods and systems as described in the examples above. The exemplary computing system of FIG. 9 includes: 1) one or more processors 301; 2) a memory control hub (MCH) 302; 3) a system memory 303 (of which different types exist such as DDR RAM, EDO RAM, etc,); 4) a cache 304; 5) an I/O control hub (ICH) 305; 6) a graphics processor 306; 7) a display/screen 307 (of which different types exist such as Cathode Ray Tube (CRT), Thin Film Transistor (TFT), Liquid Crystal Display (LCD), DPL, etc.); and/or 8) one or more I/O devices 308.

The one or more processors 301 execute instructions in order to perform whatever software routines the computing system implements. The instructions frequently involve some sort of operation performed upon data. Both data and instructions are stored in system memory 303 and cache 304. Cache 304 is typically designed to have shorter latency times than system memory 303. For example, cache 304 might be integrated onto the same silicon chip(s) as the processor(s) and/or constructed with faster SRAM cells while system memory 303 might be constructed with slower DRAM cells. By tending to store more frequently used instructions and data in the cache 304 as opposed to the system memory 303, the overall performance efficiency of the computing system improves.

System memory 303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 303 prior to their being operated upon by the one or more processor(s) 301 in the implementation of a software program. Similarly, data that a software program determines should be sent from the computing system to an outside entity through one of the computing system interfaces, or stored into an internal storage element, is often temporarily queued in system memory 303 prior to its being transmitted or stored.

The ICH 305 is responsible for ensuring that such data is properly passed between the system memory 303 and its appropriate corresponding computing system interface (and internal storage device if the computing system is so designed). The MCH 302 is responsible for managing the various contending requests for system memory 303 access amongst the processor(s) 301, interfaces and internal storage elements that may proximately arise in time with respect to one another.

One or more I/O devices 308 are also implemented in a typical computing system. I/O devices generally are responsible for transferring data to and/or from the computing system (e.g., a networking adapter); or, for large scale non-volatile storage within the computing system (e.g., hard disk drive). ICH 305 has bi-directional point-to-point links between itself and the observed I/O devices 308.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer system comprising:
a processor configured to execute instructions stored in a non-transitory computer-readable medium to perform operations comprising:
receiving a structured artwork file in a development environment, wherein the structured artwork file comprises a plurality of artwork fragments organized in a plurality of logical units, wherein the development environment is configured for editing executable code of an application under development,
automatically determining a change to the structured artwork file by an application independent of the development environment, wherein the change to the structured artwork file comprises a change to an organization of at least some of the plurality of logical units, wherein the change to the organization comprises moving one of the plurality of artwork fragments from a first logical unit of the plurality of logical units to a second logical unit of the plurality of logical units,
identifying an interface component code segment corresponding to the at least one of the artwork fragment and the organization, wherein the interface component code segment comprises executable code for providing an interface component of a graphical interface configured for receiving input or providing output of the application under development, and
modifying the interface component code segment in the development environment based on determining the change to the structured artwork file.

2. The computer system set forth in claim 1, wherein the change to the structured artwork file further comprises an edit to the artwork fragment and wherein modifying the interface component code segment comprises modifying executable code for accessing a component skin based on the artwork fragment as edited.

3. The computer system set forth in claim 1, wherein the change to the organization comprises an addition or deletion of a logical unit to the plurality of logical units in the structured artwork file.

4. The computer system set forth in claim 1, wherein the operations further comprise:
providing a development interface in the development environment for viewing the interface component code segment as modified;
rendering a representation of interface component in the development interface, wherein the representation includes an appearance of the interface component caused by executing the executable code of the interface component code segment.

5. A computer-implemented method comprising:
receiving a structured artwork file in a development environment, wherein the structured artwork file comprises a plurality of artwork fragments organized in a plurality of logical units, wherein the development environment is configured for editing executable code of an application under development;
automatically determining a change to the structured artwork file by an application independent of the development environment, wherein the change to the structured artwork file comprises a change to an organization of at least some of the plurality of logical units, wherein the change to the organization comprises moving one of the plurality of artwork fragments from a first logical unit of the plurality of logical units to a second logical unit of the plurality of logical units;
identifying an interface component code segment corresponding to the at least one of the artwork fragment and the organization, wherein the interface component code segment comprises executable code for providing an interface component of a graphical interface configured for receiving input or providing output of the application under development; and
modifying the interface component code segment in the development environment based on determining the change to the structured artwork file.

6. The method of claim 5, wherein the change to the structured artwork file further comprises an edit to the artwork fragment, wherein the edit to the artwork fragment comprises a change to a color, a position, or text of the artwork fragment, wherein modifying the interface component code segment comprises modifying at least one of a color property, a position property, or a text property specified in the interface component code segment.

7. The method of claim 5, wherein the plurality of artwork fragments comprises static artwork fragments.

8. The method of claim 5, wherein the plurality of logical units comprises a plurality of layers in the structured artwork file having a respective plurality of artwork fragments, wherein identifying the interface component code segment comprises correlating the plurality of layers to the interface component code segment.

9. The method of claim 5, wherein the plurality of logical units comprises a plurality of layers in the structured artwork file.

10. The method of claim 9, wherein modifying the interface component code segment comprises updating a state of the interface component code segment to use the one of the plurality of artwork fragments in the second layer.

11. The method of claim 5, wherein identifying the interface component code segment comprises correlating a plurality of parts of the interface component to a first plurality of artwork fragments in a first plurality of respective layers in the structured artwork file and correlating a plurality of states of the interface component to a second plurality of artwork fragments in a second plurality of respective layers in the structured artwork file.

12. The method of claim 5, wherein the plurality of logical units comprises a plurality of tabs or pages in the structured artwork file having a respective plurality of artwork fragments, wherein identifying the interface component code segment comprises correlating the plurality of tabs or pages to the interface component code segment.

13. The method of claim 5, wherein the change to the structured artwork file comprises the change to the organization, wherein the change to the organization comprises adding or removing at least one organizational unit of the plurality of logical units and wherein modifying the interface component code segment comprises respectively adding or removing at least one state of the interface component corresponding to the at least one organizational unit being added or removed.

14. The method of claim 5,
wherein the change to the structured artwork file further comprises an edit to an artwork fragment of the plurality of artwork fragments;
wherein determining the change to the structured artwork file comprises:
identifying a modification to an absolute position of the artwork fragment, and
determining a change to a relative position of an additional artwork fragment of the plurality of artwork fragments with respect to the position of the artwork fragment;
wherein modifying the interface component code segment comprises:
identifying a correlation between the relative position of the additional artwork fragment with respect to the artwork fragment and a relative position of the interface component with respect to an additional interface component, and
modifying the relative position of the interface component with respect to the additional interface component based on the change to the relative position of the additional artwork fragment with respect to the position of the artwork fragment.

15. The method of claim 5, further comprising providing a development interface in the development environment for viewing the interface component code segment as modified.

16. A non-transitory computer-readable medium embodying program code executable by a computer system, the computer-readable medium comprising:
program code for receiving a structured artwork file in a development environment, wherein the structured artwork file comprises a plurality of artwork fragments organized in a plurality of logical units, wherein the development environment is configured for editing executable code of an application under development;
program code for automatically determining a change to the structured artwork file by an application independent of the development environment, wherein the change to the structured artwork file comprises a change to an organization of at least some of the plurality of logical units, wherein the change to the organization comprises moving one of the plurality of artwork fragments from a first logical unit of the plurality of logical units to a second logical unit of the plurality of logical units;
program code for identifying an interface component code segment corresponding to the at least one of the artwork fragment and the organization, wherein the interface component code segment comprises executable code for providing an interface component of a graphical interface configured for receiving input or providing output of the application under development; and
program code for modifying the interface component code segment in the development environment based on determining the change to the structured artwork file.

17. The non-transitory computer-readable medium of claim 16, wherein the plurality of logical units comprises a plurality of layers in the structured artwork file having a respective plurality of artwork fragments, wherein identifying the interface component code segment comprises correlating the plurality of layers to the interface component code segment.

18. The non-transitory computer-readable medium of claim 16, wherein the plurality of logical units comprises a plurality of layers in the structured artwork file.

19. The non-transitory computer-readable medium of claim 18, wherein modifying the interface component code segment comprises updating a state of the interface component code segment to use the one of the plurality of artwork fragments in the second layer.

20. The non-transitory computer-readable medium of claim 16, wherein identifying the interface component code segment comprises correlating a plurality of parts of the interface component to a first plurality of artwork fragments in a first plurality of respective layers in the structured artwork file and correlating a plurality of states of the interface component to a second plurality of artwork fragments in a second plurality of respective layers in the structured artwork file.

21. The non-transitory computer-readable medium of claim 16, wherein the plurality of logical units comprises a plurality of tabs or pages in the structured artwork file having a respective plurality of artwork fragments, wherein identifying the interface component code segment comprises correlating the plurality of tabs or pages to the interface component code segment.

22. The non-transitory computer-readable medium of claim 16, wherein the change to the organization comprises adding or removing at least one organizational unit of the plurality of logical units and wherein modifying the interface component code segment comprises respectively adding or removing at least one state of the interface component corresponding to the at least one organizational unit being added or removed.

23. The non-transitory computer-readable medium of claim 16,
wherein the change to the structured artwork file further comprises an edit to an artwork fragment of the plurality of artwork fragments;
wherein determining the change to the structured artwork file comprises:
identifying a modification to an absolute position of the artwork fragment, and
determining a change to a relative position of an additional artwork fragment of the plurality of artwork fragments with respect to the position of the artwork fragment;
wherein modifying the interface component code segment comprises:
identifying a correlation between the relative position of the additional artwork fragment with respect to the artwork fragment and a relative position of the interface component with respect to an additional interface component, and
modifying the relative position of the interface component with respect to the additional interface component based on the change to the relative position of the additional artwork fragment with respect to the position of the artwork fragment.

* * * * *

UNITED STATES PATENT AND TRADEMARK OFFICE
CERTIFICATE OF CORRECTION

PATENT NO.        : 8,645,105 B1                        Page 1 of 1
APPLICATION NO.   : 12/271372
DATED             : February 4, 2014
INVENTOR(S)       : Mark Shepherd et al.

It is certified that error appears in the above-identified patent and that said Letters Patent is hereby corrected as shown below:

In the Claims

Column 19, Claim 1, Line 44
Delete the word:
"the"
following the phrase "corresponding to"

Column 20, Claim 5, Line 24
Delete the word:
"the"
following the phrase "corresponding to"

Column 21, Claim 13, Lines 3-4
Delete the words:
"wherein the change to the structured artwork file comprises the change to the organization,"

Column 21, Claim 16, Line 58
Delete the word:
"the"
following the phrase "corresponding to"

Signed and Sealed this
Second Day of December, 2014

Michelle K. Lee
*Deputy Director of the United States Patent and Trademark Office*